United States Patent [19]

Bossel

[11] Patent Number: 5,034,288
[45] Date of Patent: Jul. 23, 1991

[54] ARRANGEMENT OF FUEL CELLS BASED ON A HIGH-TEMPERATURE SOLID ELECTROLYTE OF STABILIZED ZIRCONIUM OXIDE FOR ACHIEVING MAXIMUM POSSIBLE POWER

[75] Inventor: Ulf Bossel, Baden, Switzerland

[73] Assignee: Asea Brown Boveri Ltd., Baden, Switzerland

[21] Appl. No.: 461,689

[22] Filed: Jan. 8, 1990

[30] Foreign Application Priority Data

Jan. 18, 1989 [CH] Switzerland ............................ 156/89

[51] Int. Cl.$^5$ ............................................. H01M 8/12
[52] U.S. Cl. ........................................ 429/32; 429/38; 429/39
[58] Field of Search ........................ 429/30, 32, 38, 39

[56] References Cited

U.S. PATENT DOCUMENTS

| | | | |
|---|---|---|---|
| 3,717,506 | 2/1973 | Hopkins | 429/32 |
| 4,395,468 | 7/1983 | Isenberg . | |
| 4,463,065 | 7/1984 | Hegedus et al. | 429/33 |
| 4,476,198 | 10/1984 | Ackerman et al. | 429/32 |
| 4,510,212 | 4/1985 | Fraioli | 429/30 |
| 4,692,274 | 9/1987 | Isenberg et al. . | |

FOREIGN PATENT DOCUMENTS 2148045 5/1985 United Kingdom .
2219125 11/1989 United Kingdom .

OTHER PUBLICATIONS

Brown Boveri Review Jan./Feb. 1966, pp. 21–30, O. Antonsen, et al., "Hochtemperatur-Brennstoffbatterie Mit Keramischen Elektrolytem" (High-Temperature Fuel Battery with Ceramic Electrolyte).

Extended Abstracts, Fuel Technology and Applications, International Seminar, The Netherlands, Oct. 26–29, 1987, pp. 262–273, W. J. Dollard, et al., "An Overview of the Westinghouse Electric Corporation Solid Oxide Fuel Cell Program".

Solid Electrolytes, 1978 by Academic Press, Inc., pp. 431–450, F. J. Rohr, "High-Temperature Fuel Cells".

Argonne National Laboratory, Paper presented at the 1986 Fuel Cell Seminar, Oct. 26–29, 1986, Tuczon, AZ, D.C. Fee, et al., "Monolithic Fuel Cell Development".

Primary Examiner—Stephen J. Kalafut
Attorney, Agent, or Firm—Oblon, Spivak, McClelland, Maier & Neustadt

[57] ABSTRACT

Arrangement of fuel cells based on a high-temperature solid electrolyte (1) of stabilized $ZrO_2$ for achieving maximum possible power in minimum space by electrical series connection and mechanical stacking of a plurality of flat, plane plate-shaped fuel cells (1; 2; 3) on the filter press principle, in each case the oxygen electrode (2) of the one fuel cell being connected to the fuel electrode (3) of the next-following fuel cell by an electrically conductive element (4), which contains flow channels for the gaseous media. Design of the electrically conductive elements as a bipolar plate (4) provided with elevations (11). Cross-flow principle. Chequerboard-like arrangement of a plurality of fuel cell stacks (33) next to one another: best utilization of space, maximum power density.

5 Claims, 4 Drawing Sheets

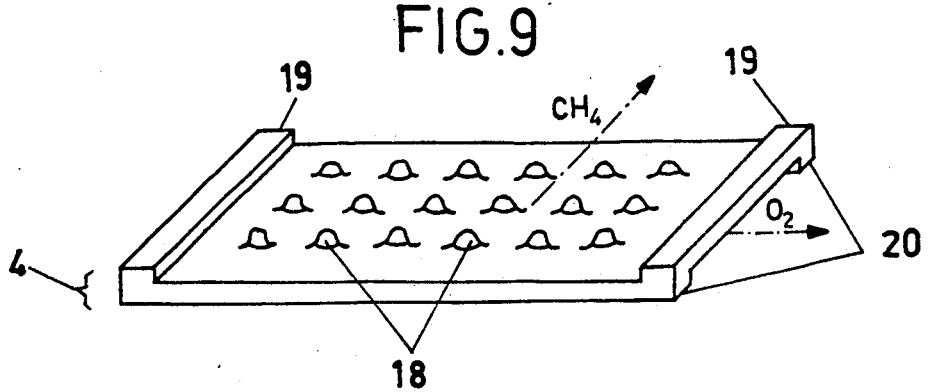
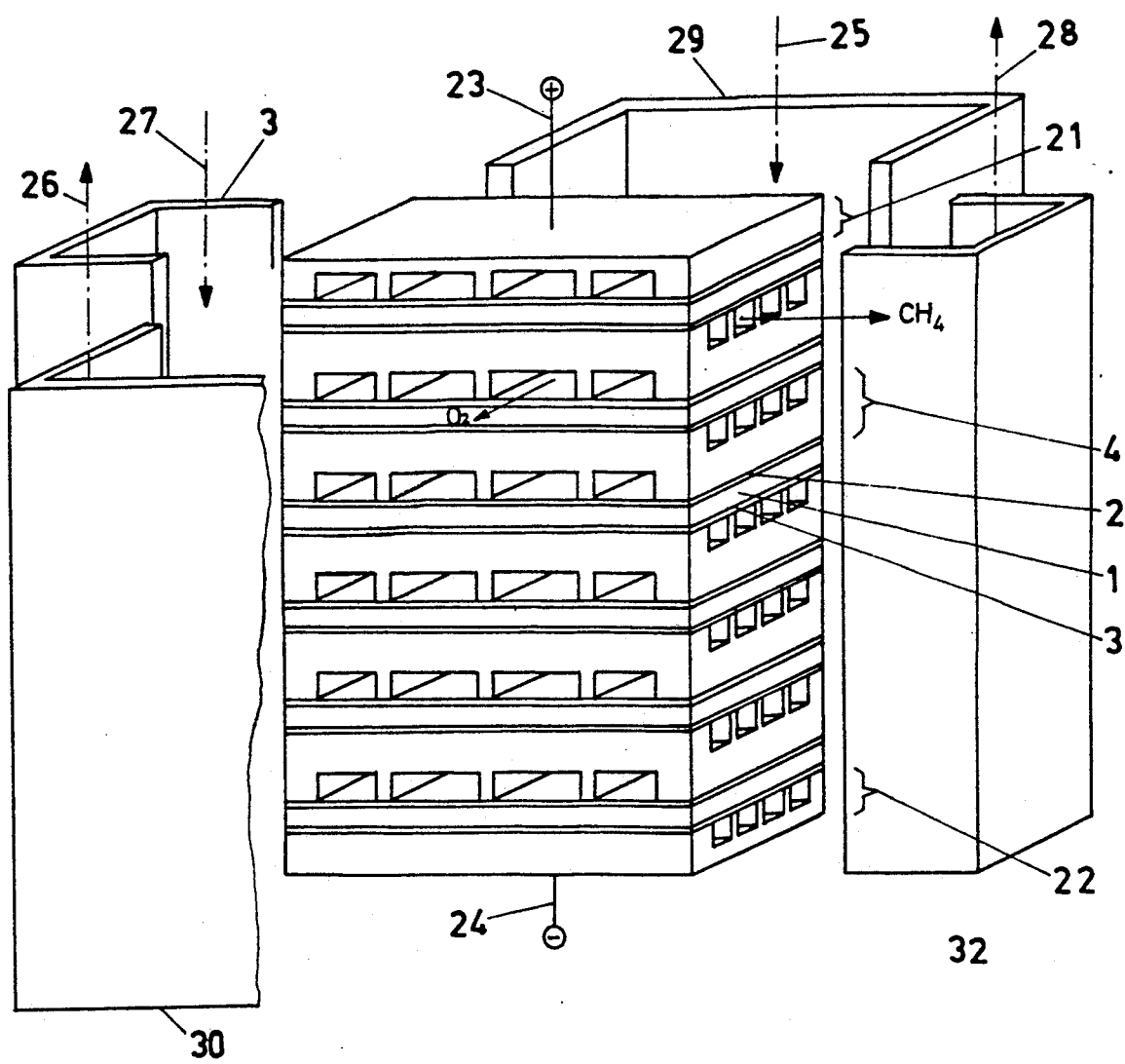

ARRANGEMENT OF FUEL CELLS BASED ON A HIGH-TEMPERATURE SOLID ELECTROLYTE OF STABILIZED ZIRCONIUM OXIDE FOR ACHIEVING MAXIMUM POSSIBLE POWER

TITLE OF THE INVENTION

Arrangement of fuel cells based on a high-temperature solid electrolyte of stabilized zirconium oxide for achieving maximum possible power

BACKGROUND OF THE INVENTION

Field of the Invention

High-temperature fuel cells for the conversion of chemical energy into electrical energy. Electrochemical energy conversion and the equipment required for this are gaining importance over other types of conversion by virtue of its good efficiency.

The invention concerns further development of the electrochemical high-temperature cells using ceramic solid electrolytes as ion conductors, the intention being for the cells to be substantially independent of the fuel used and to ensure a space-saving arrangement.

In particular, it relates to an arrangement of fuel cells based on a high-temperature solid electrolyte of stabilized zirconium oxide for achieving maximum possible power in minimum space.

Discussion of Background

High-temperature fuel cells with ceramic solid electrolyte are known from numerous publications. The actual elements for such cells may have a wide variety of forms and dimensions. In order to keep ohmic voltage losses small, attempts are made everywhere to keep the thickness of the electrolyte layer as small as possible. Form and dimensions of the elements are also governed by the requirement for the possibility of electrical series connection of a plurality of cells in order to attain the necessary terminal voltage and to keep the currents comparatively low. Elements exist in the form of:
  cylindrical tubes (Westinghouse),
  conical tubes, similar to "Schachtelhalm" (Dornier)
  trapezoidal corrugations (Argonne)
  circular plates (ZTEK).
In the development of fuel cells with ceramic solid electrolyte, so far attention has been focussed virtually only on improving and reducing the cost of ceramic components in the form of tubular fuel cell elements. Virtually no indications are to be found as to suitable arrangements for the optimum possible utilization of space and the achievement of high voltages by suitable configurations advantageous for series connection of the individual cells.

The following publications may be cited as prior art:
  O. Antonsen, W. Baukal and W. Fischer, "HochtemperaturBrennstoffbatterie mit keramischem Electrolyten" (High-temperature Fuel Battery With Ceramic Electrolyte), Brown Boveri Review Jan.-/Feb. 1966, pages 21–30,
  U.S. Pat. No. A-4692274
  U.S. Pat. No. A-4395468
  W. J. Dollard and W. G. Parker, "An overview of the Westinghouse Electric Corporation solid oxide fuel cell program", Extended Abstracts, Fuel Cell Technology and Applications, International Seminar, The Hague, The Netherlands, Oct. 26 to 29, 1987.
  F. J. Rohr, High-Temperature Fuel Cells, Solid Electrolytes, 1978 by Academic Press, Inc., page 431 et seq.
  D. C. Fee et al., Monolithic Fuel Cell Development, Argonne National Laboratory, Paper presented at the 1986 Fuel Cell Seminar, Oct. 26-29, 1986, Tucson, AZ, U.S. Department of Energy, The University of Chicago.

The known basic elements used for fuel cells are mostly distinguished by a comparatively complicated geometry, which hinders the construction of compact, space-saving systems. In addition, adhering to the proposed forms, cost-effective production on an industrial scale is scarcely possible. In particular, no configuration exists which can be used for an optimum series connection of the individual cells and can be realized with simple means of production.

There is therefore a great need for further development, simplification and rationalization of the design and production of basic components, and their optimum mutual arrangement, based on ceramic high-temperature fuel cells.

SUMMARY OF THE INVENTION

Accordingly, one object of this invention is to provide a novel arrangement of fuel cells based on a high-temperature solid electrolyte of stabilized zirconium oxide which achieves maximum possible power in minimum space, ensures a satisfactory series connection of a plurality of fuel cells and a good current transfer between neighboring cells with minimum losses and permits assembly in blocks to form large power units. The design and arrangement of the fuel cells and of the other components is to ensure cost-effective industrial production.

This object is achieved by a plurality of fuel cell elements, each consisting of a plane, flat sheet, being stacked one on top of the other and connected electrically in series in the arrangement of fuel cells mentioned at the beginning in such a way that in each case the oxygen electrode of the one element is connected to the fuel electrode of the next-following element by an electrically conductive component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 shows a perspective representation of a bipolar plate with lateral limitation, FIG.10 shows a perspective representation of a stack of a plurality of fuel cells and bipolar plates with associated guides and channels of the gaseous media.

DESCRIPTION OF THE PREFERRED EMBODIMENTS

Figure 1:
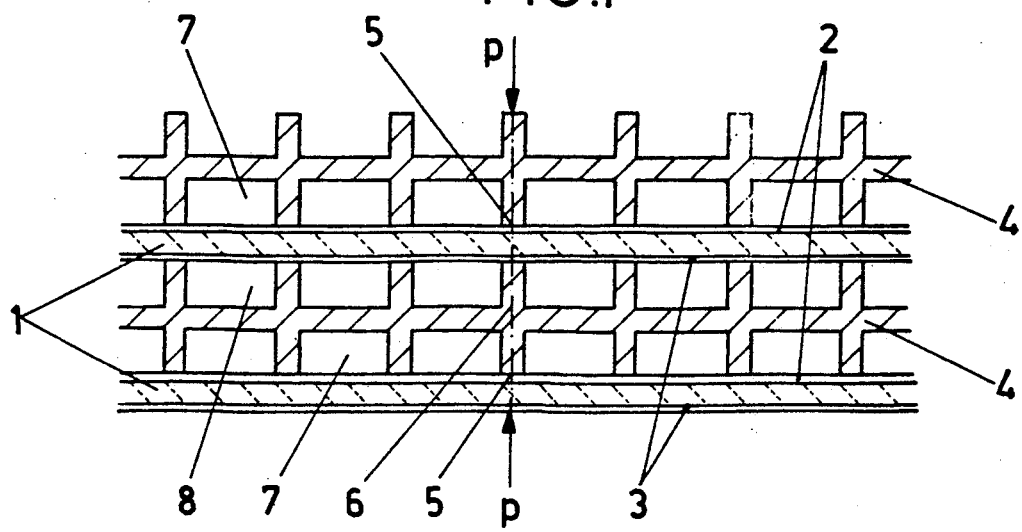
FIG. 1 shows a section through an arrangement of fuel cells and bipolar plates.

Referring now to the drawings, wherein like reference numerals designate identical or corresponding parts throughout the several views, in FIG. 1 a section through an arrangement of fuel cells and bipolar plates is represented. 1 is the ceramic solid electrolyte, in the present case in the form of doped, stabilized $ZrO_2$. 2 is the porous (positive) oxygen electrode of, for example, La/Mn perovskite, 3 is the porous (negative) fuel electrode of, for example, $Ni/ZrO_2$ cermet. 4 is the bipolar plate, which ensures the electrical current conduction between the oxygen electrode 2 of a fuel cell and the fuel electrode 3 of the next-following fuel cell. At the same time, it represents the frictional mechanical link of the complete stack, constructed on the filter press principle of a plurality of series-connected fuel cells. The axial pressure p of such a stack is transferred via the pressure points (or pressure lines) 5 onto the neighboring electrodes. The bipolar plates 4, provided with corresponding elevations, are arranged in such a way that the lines of effect (or planes of effect) of the compressive forces through the complete stack are in alignment. Therefore, only compressive forces are exerted. The bipolar plate 4 is not subjected to additional bending or shearing. In addition, the risk of the bipolar plates beginning to tear or breaking and the diminishment during operation of the contact pressure p on the electrode surfaces is reduced to a minimum. Due to the bipolar plate 4 and the neighboring electrodes 2 and 3, the channels 7 are formed for gaseous oxygen carriers (air) and the channels 8 for gaseous fuel ($CH_4$).

Figure 2:
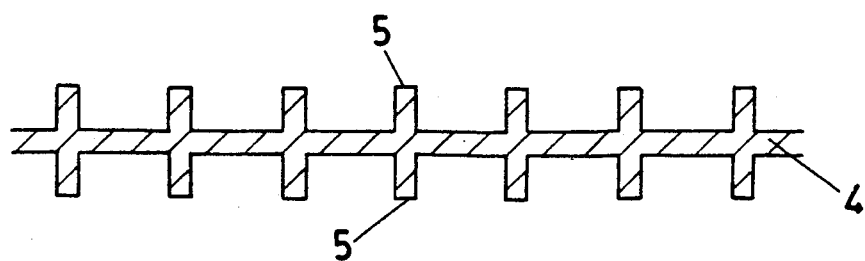
FIG. 2 shows a section through a diagrammatic representation of a bipolar plate.

FIG. 2 concerns a section through a diagrammatic representation of a single bipolar plate, the basic design of which can be recognized. The bipolar plate 4 consists of the actual plate-shaped plane body, which is equipped on both sides with elevations (studs, ribs) for the exertion of an increased pressure at the contact points with the adjacent neighboring electrodes. Pressure point (or pressure line) 5 !

Figure 3:
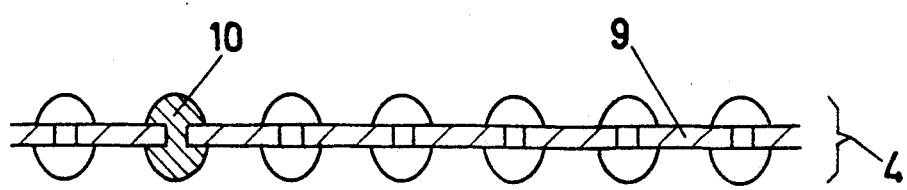
FIG. 3 shows a section through a metallic bipolar plate with rivets.

FIG. 3 shows a section through a metallic bipolar plate with rivets. In the present case, the bipolar plate 4 consists of a flat, plane sheet 9, which is provided with rivets 10, the round heads of which protrude on both sides. High-temperature materials such as nickel alloys or platinum metal alloys come into consideration as materials.

Figure 4:
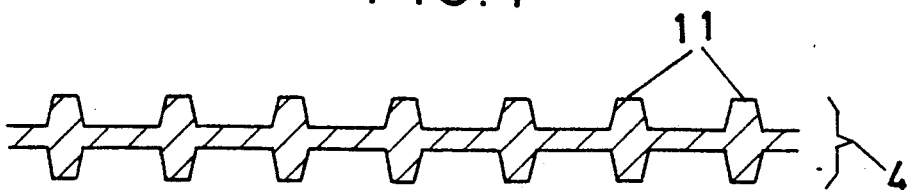
FIG. 4 shows a section through a metallic bipolar plate in the form of a compact.

In FIG. 4, a section through a metallic bipolar plate in the form of a compact is represented. The bipolar plate 4 consists of a flat, plane middle part and studs (or bars or ribs) 11, which form a monolithic whole. The compact may be produced from a sheet by rolling, pressing, etc. or by powder-metallurgical methods.

Figure 5:
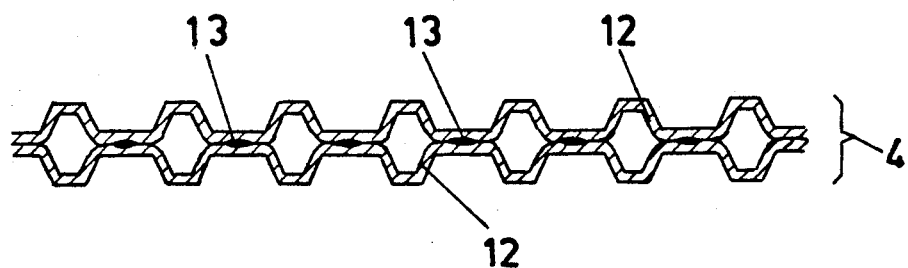
FIG. 5 shows a section through a metallic bipolar plate consisting of sheets.

In FIG. 5, a section through a metallic bipolar plate consisting of sheets is represented. In the present case, the bipolar plate 4 consists of two symmetrical sheets 12, provided with studs or ribs, laid one on top of the other and welded firmly to each other. The welds 13 are represented by black lenticular points in the section: spot or seam welding !

Figure 6:
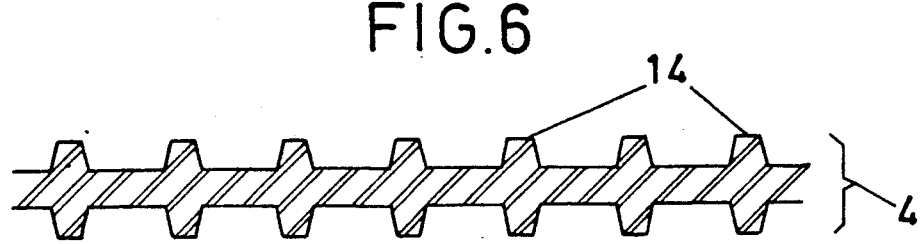
FIG. 6 shows a section through a bipolar plate in the form of a compact of a ceramic material or a cermet composite material.

FIG. 6 shows a section through a bipolar plate in the form of a compact of a ceramic material or a cermet-composite material. The central, plate-shaped body forms with the studs or bars (ribs) 14 a monolithic whole. The bipolar plate 4 has basically the same form as in FIG. 4, but the central part is made somewhat stronger. Production is performed by the ceramic methods related to powder metallurgy.

Figure 7:
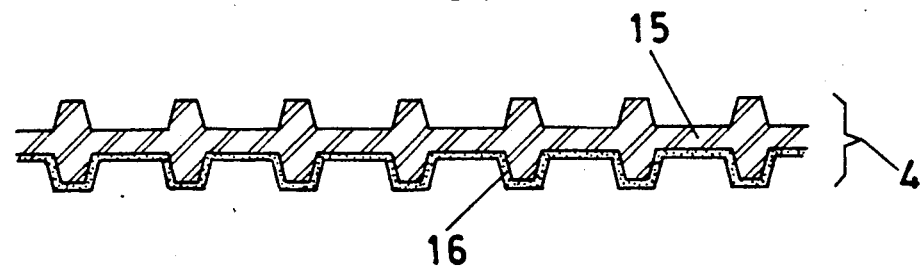
FIG. 7 shows a section through a bipolar plate consisting of a ceramic material as a compact with a one-sided surface protection layer.

FIG. 7 concerns a section through a bipolar plate consisting of a ceramic material as a compact, with a one-sided surface protection layer. The compact 15, provided with studs or ribs, corresponds substantially to that of FIG. 6. One side of the compact 15 — preferably the oxygen side — is provided with a surface protection layer 16. In the present case, it is, for example, an oxidation-resistant surface protection layer of an electrically conductive La/Mn perovskite (the same or similar material as the oxygen electrode 2). The coating is performed by spraying, atomizing, dipping, brushing, rolling on a green strip or by powder-metallurgical methods.

Figure 8:
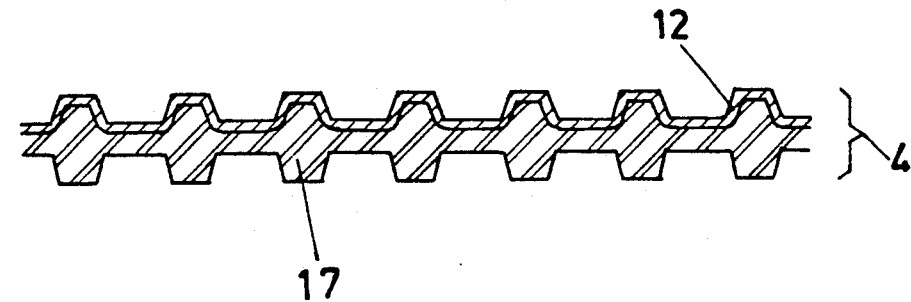
FIG. 8 shows a section through a bipolar plate consisting of a sheet and a pressed-on ceramic material as a composite.

FIG. 8 represents a section through a bipolar plate consisting of a sheet and a pressed-on ceramic material, as a composite. The sheet 12, provided with studs or ribs, is covered on one side with a body 17 of a ceramic material, likewise provided with symmetrically arranged studs or ribs. This body 17 is pressed onto the sheet 12, and into its depressions, and preferably consists of an electrically conductive, oxidation-resistant ceramic material, for example of La/Mn perovskite. Production is performed by the usual methods of ceramics and powder metallurgy.

FIG. 9 shows a perspective representation of a bipolar plate with lateral limitation. The bipolar plate 4, consisting of a metallic or ceramic material or a cermet, has studs 18 on its upper side and on its lower side (not visible). On its upper side (fuel side), the bipolar plate has a lateral limiting bar 19, running from front to back, on its left edge and on its right edge. On its lower side (oxygen side), it is equipped at the front edge and at the rear edge with a lateral limiting bar 20, running from left to right. The longitudinal directions of the limiting bars 19 and 20 are thus perpendicular to each other, which also corresponds to the directions of flow of the gaseous media. This is indicated by the arrows for $O_2$ (oxygen side) and $CH_4$ (fuel side). This is consequently a case of the cross-flow principle.

FIG. 10 concerns a perspective representation of a stack of a plurality of fuel cells and bipolar plates with associated guides and channels of the gaseous media. 21 is the oxygen-side end plate, which represents the positive pole of the stack of the fuel cells 4. 22 is the fuel-side end plate (negative pole). 1 is the solid electrolyte, 2 the oxygen electrode and 3 the fuel electrode. 23 is, diagrammatically, the electric lead to the positive terminal, 24 the lead to the negative terminal. The arrow 25 is the feed of the gaseous oxygen carrier (for example air), the arrow 26 the corresponding removal of the excess of the latter and of the ballast substances (in the present case nitrogen). The arrow 27 represents the feed of the gaseous fuel (for example $CH_4$), the arrow 28 the corresponding removal of the excess of the fuel and of the gaseous reaction products ($CO_2$; $H_2O$). The supply and discharge of the gaseous media to and from the stack of the fuel cells 4 is performed via corresponding channels, arranged laterally of the stack. 29 is the (diagrammatic) channel wall of the feed channel for the gaseous oxygen carrier, 30 the corresponding channel wall of the removal channel for the $O_2$ excess and the ballast. 31 represents the channel wall of the feed channel for the gaseous fuel, 32 the corresponding channel wall of the removal channel for the fuel excess and the reaction products. The direction of flow within a bipolar plate 4 is indicated by the arrows $O_2$ and $CH_4$. The cross-flow principle is implemented consistently throughout the stack. Of course, as a departure from FIG. 10, the removal of the gaseous media may also take place downward (in the same sense as the flow of the feed) instead of upward (in the opposite sense to the flow of the feed).

Figure 11:
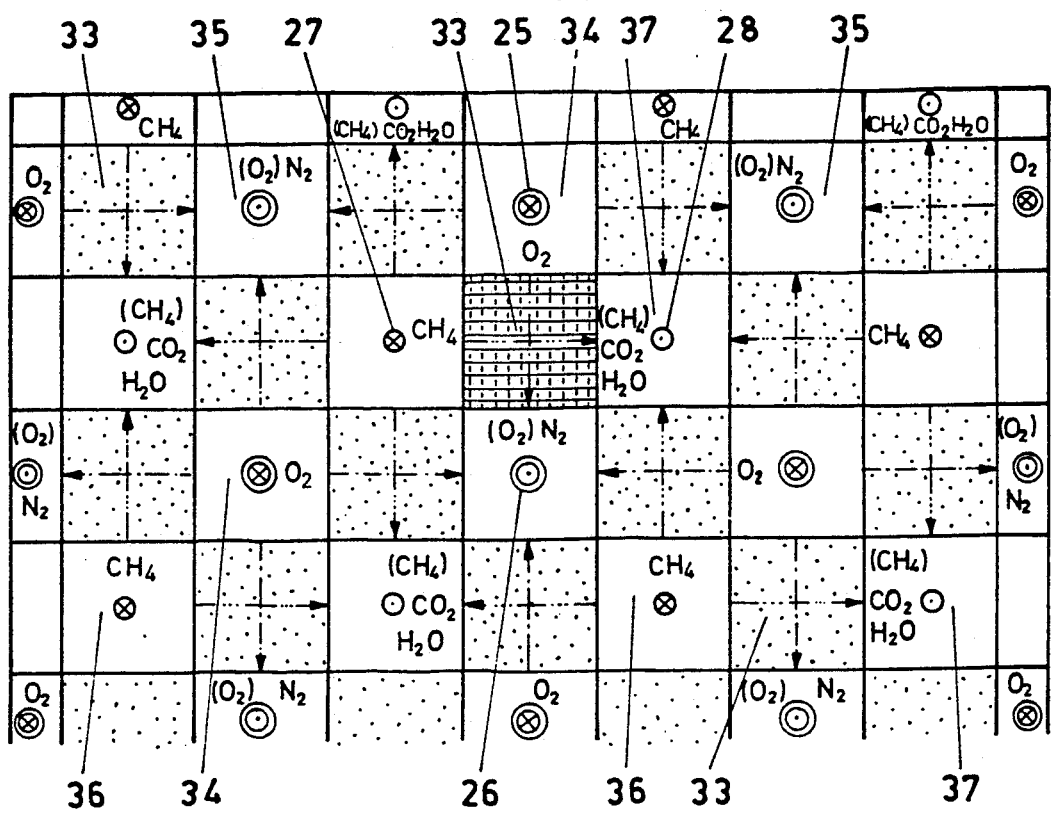
FIG.11 shows an outline (plan view) of an arrangement of a plurality of square fuel cell stacks with associated guides of the gaseous media.

In FIG. 11, an outline (plan view) of an arrangement of a plurality of square fuel cell stacks with associated guides of the gaseous media is represented. 33 is a plate stack of a plurality of fuel cells with bipolar plates, in the present case of square cross-section (outline). 34 and 36 are respectively, a flue-shaped feed channel of square cross section for the gaseous oxygen carrrier and fuel, the outline of which channel is brought about by the checkerboard-like arrangement of the fuel cell stacks. 25 is the corresponding vector of the direction of flow perpendicularly to the plane of the drawing with directional sense into the latter. 35 and 37 are respectively a corresponding flue-shaped removal channel for the $O_2$ excess and the ballast, and for excess fuel and reaction products. 26 is the corresponding vector of the direction of flow perpendicularly to the plane of the drawing with directional sense out of the latter. The direction of flow of the gaseous media in the plane of the drawing, i.e. within a fuel cell or between electrode and bipolar plate, is represented by arrows $O_2$ and $CH_4$ as well as arrow heads ($O_2$); $N_2$ and ($CH_4$); $CO_2$; $H_2O$. In one stack, the bipolar plate is emphasized more clearly in outline and the direction of flow between corresponding ribs is also more clearly emphasized (cross-flow principle). In the present case, $O_2$ flows underneath, $CH_4$ flows above the bipolar plate (seen from the observer's viewpoint). At the outer limitations of the complete stack battery, channels of reduced cross section are arranged, corresponding to smaller volumetric flow.

Figure 12:
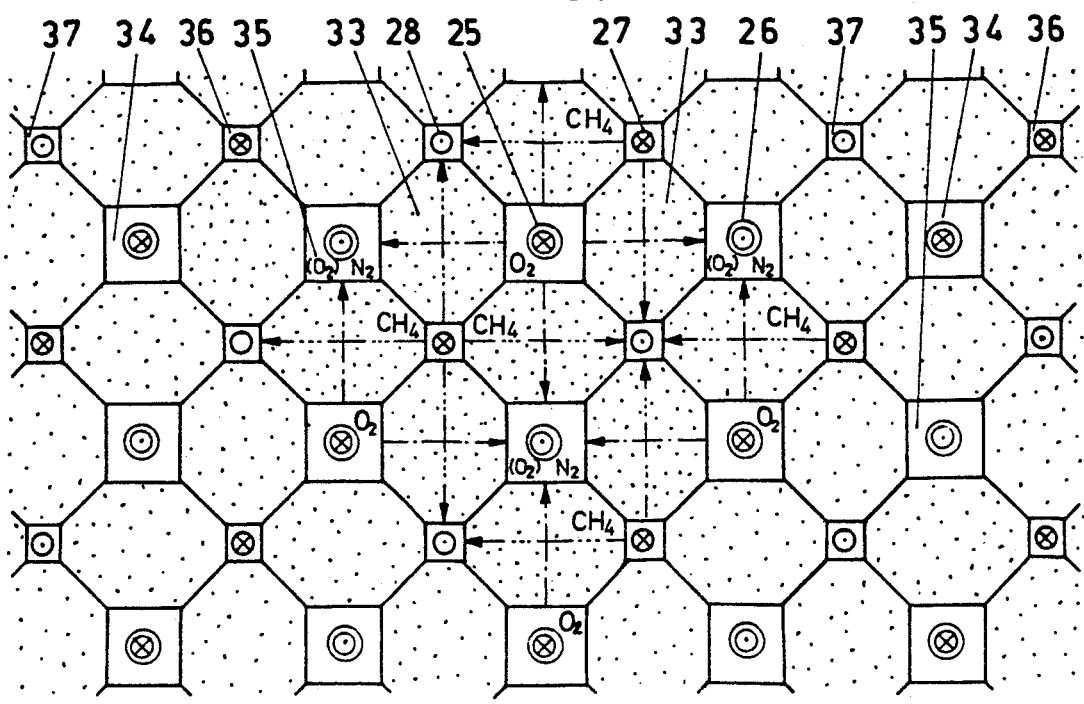
FIG.12 shows an outline (plan view) of an arrangement of a plurality of octagonal fuel cell stacks with associated guides of the gaseous media.

In FIG. 12, an outline (plan view) of an arrangement of a plurality of octagonal fuel cell stacks with associated guides of the gaseous media is represented. All the reference numerals basically correspond to those of FIG. 11. The octagonal outline of the fuel cells and bipolar plates was brought about by a reduction in the square cross sections of the flue-shaped channels for the gaseous media to the necessary amount required rheologically (aerodynamically, thermodynamically). Since, generally, in the present case the gaseous oxygen carrier (air) and the ballast ($N_2$) represent a greater volumetric flow than the gaseous fuel ($CH_4$) and the reaction products ($CO_2$; $H_2O$) and, in addition, a shorter path in the fuel cell for the oxygen carrier but a longer path in the fuel cell for the fuel is advantageous, the inequilateral octagonal form for the said cell results. Correspondingly, the flue-shaped channels of the gaseous media have a different cross section. The inequilateral octagonal form of the fuel cells and of the bipolar plates allows an optimum utilization of space of the block consisting of a plurality of stacks. As a result, with this design the maximum possible power density can be achieved at the same time as very advantageous thermodynamics.

Exemplary Embodiment 1

See FIG. 3!

A plane bipolar plate 4 was produced from a metallic material of high resistance to oxidation and corrosion at high temperatures having the trade name "Inconel". The material had the following composition:

$Ni = 80\%$ by weight
$Cr = 14\%$ by weight
$Fe = 6\%$ by weight

The plate was square, with 40 mm sides length and a thickness of 0.5 mm. It was produced from a sheet 9 of 46 mm×46 mm side length and bent off by 3 mm on opposite sides in a downward direction and in an upward direction perpendicularly to (cf. principle of FIG. 9). The flat part from was provided with rivets 10 of 2 mm diameter of the same material in such a way that the axes of the said rivets had a spacing of 6 mm in a straight line parallel to one side of the plate and each two neighboring rows of rivets were offset by half that amount (3 mm) with respect to each other. The heads of the rivets 10 were ground plane-parallel on both sides of the bipolar plate 4. On the oxygen side, an about 50 μm thick layer of La/Mn perovskite was applied by plasma spraying. A stack consisting of bipolar plates 4 and fuel cells (1, 2, 3 in FIG. 1) was loaded with a total of about 7.2 N, so that the compressive force p per rivet 10 was on average 0.2 N.

Exemplary Embodiment 2

See FIG. 4!

A bipolar plate 4, provided with studs 11, was hot-pressed out of the same material as in Example 1. The plate was on average 0.6 mm thick and had a side length of 60 mm. The studs 11 had a conical form with a diameter at the base of 1.0 mm, at the head of 0.6 mm. Their total height, measured over both sides, was 2.2 mm. The spacing of the rows of studs in offset arrangement was 7 mm. The studs 11 were reground on both sides.

A stack consisting of bipolar plates and fuel cells was loaded with 16 N perpendicularly to the plane of the plate, so that an individual force of 0.25 N acted on each of the studs.

Exemplary Embodiment 3

See FIG. 5!

Two corrugated bodies were produced from a plate of a nickel-based alloy. The material, having the trade name Nimonic 80A, had the following composition:

$Cr = 19.5\%$ by weight
$Al = 1.4\%$ by weight
$Ti = 2.4\%$ by weight
$Zr = 0.06\%$ by weight
$Mn = 0.30\%$ by weight
$Si = 0.30\%$ by weight
$B = 0.003\%$ by weight
$C = 0.06\%$ by weight
$Ni = $ Remainder The trapezoidal ribs of the 0.5 mm thick sheet 12 had a center-to-center distance of 6 mm, a width of 2.5 mm at the base and a width of 1.5 mm at the head. Each two sheets 12 with a surface area of 50 mm = 50 mm were laid one on top of the other in a symmetrical way and connected firmly to each other by a seam weld 13. The ribs of the bipolar plate 4 formed in this way were thus in alignment on both sides, so that essentially no compressive forces were transferred in operation. The heads of the ribs were reground plane on both sides. The oxygen side was provided with an about 40 μm thick La/Mn perovskite layer.

Exemplary Embodiment 4

See FIGS. 6 and 7!

A bipolar plate 4 of similar design to that described under Example 2 was pressed and sintered from the electrically conductive ceramic material silicon carbide SiC. The compact 15 had a thickness of 0.8 mm and its total height, measured over the studs 14, was 5.0 mm. The spacing of the rows of studs in offset arrangement was 8 mm. The studs 14 had a conical form with a diameter at the base of 0.8 mm and at the head of 0.6 mm. The heads of the studs 14 were ground plane on both sides of the plate. Then, an oxidation-resistant surface layer 16 of La/Mn perovskite of 30 μm thickness was applied to the oxygen side by plasma spraying.

Exemplary Embodiment 5

See FIG. 8!

First of all, a corrugated body was from a sheet of Nimonic 80A in accordance with Example 3. The dimensions were the same as in Example 3. An electrically conductive, oxygen-resistant ceramic material was pressed onto the sheet 12, provided with ribs, and sintered. In the present case, an La/Mn perovskite was used for this purpose. The total thickness of the bipolar plate 4 in the central part was 1.0 mm, the total height, measured over the ribs, was 2.3 mm. After sintering, the heads of the ribs were ground plane on both sides of the bipolar plate 4.

Exemplary Embodiment 6

See FIGS. 7 and 9!

A bipolar plate 4 was pressed out of silicon carbide SiC and sintered in accordance with Example 4. Corresponding to FIG. 7, the plate was provided on both sides with studs 18 (FIG. 9). The outline was square. The side length was 40 mm. On the fuel side, limiting bars 19, each 3 mm wide, were provided on two opposite sides. The bars 19 were 40 μm lower than the height of the studs 18. On the oxygen side, there were likewise limiting bars 20, each 3 mm wide, on two opposite sides, but offset by 90°, the said bars also being 40 μm lower in height than the corresponding studs.

The oxygen side was covered with an oxidation-resistant surface layer 16 of 40 μm thickness of La/Mn perovskite. All contact surfaces were reground plane-parallel.

Exemplary Embodiment 7

See FIG. 10!

20 bipolar plates 4, and an oxygen-si endplate (21) and a fuel-side endplate (22) each, produced from the material having the trade name Nimonic 90, a heat-resistant nickel-based alloy. The alloy had the following composition:

Cr = 19.5% by weight
Co = 16.5% by weight
Al = 1.45% by weight
Ti = 2.45% by weight
Zr = 0.06% by weight
Mn = 0.30% by weight
Si = 0.30% by weight
B = 0.003% by weight
C = 0.07% by weight
Ni = Remainder The bipolar plates 4 and the endplates 21 and 22 had a square outline of 100 mm side length and had a continuous thickness in the central part of 1 mm. They were provided on each of both sides with an array of parallel ribs, crossing at 90° on one side with respect to the other. The ribs had a slight taper and an average width of 2 mm and a height of 3 mm. Their center-to-center distance was 10 mm. The oxygen side was covered with a 50 μm thick oxidation-resistant layer of $SnO_2$ doped with $Sb_2O_3$. 21 fuel cells of likewise square dimensions 100 mm × 100 mm were likewise produced. The solid electrolyte 1 consisted of stabilized $ZrO_2$ and had a thickness of 100 μm. The (positive) oxygen electrode 2 consisted of an La/Mn perovskite of 50 μm thickness. The (negative) fuel electrode 3 was produced from an Ni/$ZrO_2$ cermet. Then a stack of a total of 21 fuel cells (1, 2, 3) and 20 bipolar plates 4, including endplates 21 and 22, were assembled and subjected to an axial load of 100 N. The stack was completed by electrical leads 23 and 24 and by channel walls 29, 30, 31 and 32 for the guidance of the gaseous media.

The invention is not restricted to exemplary embodiments. The arrangement of fuel c based on a high-temperature solid electrolyte of stabilized zirconium oxide for achieving maximum posit in minimum space consists in a plurality of fuel cell elements, each consisting of a plane, flat sheet, being stacked one on top of the other and connected electrically in series in such a way that in each case the oxygen electrode of the one element is connected to the fuel electrode of the next-following element by an electrically conductive component. In this case, it is advantageous that one assembly of 10 to 20 elements each is followed by a mechanical intermediate member of a ceramic material for mechanical support. The electrically conductive component is provided in the form of a bipolar plate of metallic, ceramic or cermet material. The bipolar plate is provided on both sides with elevations in the form of studs or ribs which are — seen perpendicularly to the plane of the plate — in alignment, the cavities brought about in this way on both sides of the bipolar plate between the latter and the two unlike electrodes of neighboring fuel cells forming channels for the flowing gaseous media.

In one version, the bipolar plate consists of a metallic material, selected from a high-temperature nickel alloy or a platinum metal alloy, and is in the form of a sheet with rivets or of a compact or of a welded sheet-metal hollow body. In another version, the bipolar plate consists of a ceramic material or a cermet, selected from electrically conductive carbide or perovskite or zirconium oxide/nickel cermet or a combination of at least two of the abovementioned materials, and is in the form of a compact or a compact with an additional surface layer of a ceramic and/or metallic material applied on one side. The bipolar plate has 2 lateral limiting bars on the fuel side and two such bars on the oxygen side, the longitudinal axes of the bars on the fuel side being perpendicular to the longitudinal axes of the bars on the oxygen side, so that a channel for the gaseous media is formed on each side of the bipolar in such a way that the longitudinal axes, and directions of flow, of the two channels cross at an angle of 90°.

The arrangement of the fuel cells is such that the stack, consisting alternately of flat fuel cells and electrically conductive components in the form of bipolar plates, is encased by channels, arranged on the cross-flow principle, for the feeding of the gaseous oxygen carrier and of the gaseous fuel as well as for the removal of the excess of the gaseous oxygen carrier and of the ballast gas and the removal of the excess of the fuel and of the gaseous reaction products, and an oxygen-side endplate and a fuel-side endplate, with an electrical lead to the positive terminal and an electrical lead to the negative terminal, are provided. In the larger combined unit, a plurality of plate stacks with fuel cells and bipolar plates are set up with their longitudinal axes perpendicular on the planes of the plates disposed in parallel and vertically next to one another in such a way that their outline forms a square checkerboard-like style of plate stacks and channels in between for the gaseous media or a style of inequilateral octagonal plate stacks and differently-sized square channel cross sections in between for the oxygen carrier and the fuel. The fuel cells and the electrically conductive components in between are advantageously connected firmly to one another by joint sintering.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. An arrangement of fuel cells based on a high-temperature solid electrolyte of stabilized zirconium oxide for achieving maximum possible power in minimum space, wherein a plurality of fuel cell elements, each consisting of a plane, flat sheet, are stacked one on top of the other and connected electrically in series in such a way that in each case the oxygen electrode of the one element is connected to the fuel electrode of the next-following element by an electrically conductive component,
   wherein the electrically conductive component is in the form of a bipolar plate of metallic, ceramic or cermet material provided between every two neighboring fuel cell elements, and
   wherein the bipolar plate is provided on both sides thereof with elevations in the form of studs or ribs which are in alignment when seen perpendicularly to the plane of the plate, and wherein the resulting cavities on both sides of the bipolar plate between the latter and the two unlike electrodes of neighboring fuel cells form channels for the flowing gaseous media.

2. An arrangement of fuel cells as claimed in claim 1, wherein the bipolar plate is comprised of a metallic material, selected from a hightemperature nickel alloy or a platinum metal alloy, and is in the form of a sheet with rivets or of a compact or of a welded sheet-metal hollow body.

3. An arrangement of fuel cells as claimed in claim 1, wherein the bipolar plate comprises a ceramic material or a cermet, selected from an electrically conductive carbide or perovskite or zirconium oxide/nickel cermet or a combination of at least two of the abovementioned materials, and is in the form of a compact or of a compact with an additional surface layer of a ceramic and/or metallic material applied on one side.

4. An arrangement of fuel cells based on a high-temperature solid electrolyte of stabilized zirconium oxide for achieving maximum possible power in minimum space, wherein a plurality of fuel cell elements, each consisting of a plane, flat sheet, are stacked one on top of the other and connected electrically in series in such a way that in each case the oxygen electrode of one element is connected to the fuel electrode of the next following element by an electrically conductive component,
   wherein the electrically conductive component is in the form of a bipolar plate of metallic, ceramic or cermet material provided between every two neighboring fuel cell elements, and
   wherein the bipolar plate has two lateral limiting bars on the fuel side and two of said bars on the oxygen side, the longitudinal axes of the bars on the fuel side being perpendicular to the longitudinal axes of the bars on the oxygen side, so that a channel for the gaseous media is formed on each side of the bipolar plate in such a way that the longitudinal axes, and thus the directions of flow, of the two channels cross at an angle of 90°.

5. An arrangement of fuel cells based on a high-temperature solid electrolyte of stabilized zirconium oxide for achieving maximum possible power in minimum space, wherein a plurality of fuel cell elements, each consisting of a plane, flat sheet, are stacked one on top of the other and connected electrically in series in such a way that in each case the oxygen electrode of the one element is connected to the fuel electrode of the next following element by an electrically conductive component,
   wherein the stack, consisting alternately of flat fuel cells and electrically conductive components in the form of bipolar plates, is encased by channels arranged on the cross-flow principle for the feeding of the gaseous oxygen carrier and of the gaseous fuel as well as for the removal of the excess of the gaseous oxygen carrier and of the ballast gas and the removal of the excess of the fuel and of the gaseous reaction products, and wherein an oxygen-side endplate and a fuel-side endplate, with an electrical lead to the positive terminal and an electrical lead to the negative terminal, are provided, and
   wherein a plurality of plate stacks with fuel cells and bipolar plates are set up with their longitudinal axes perpendicular on the planes of the plates disposed in parallel and vertically next to one another in such a way that their outline forms a square checkerboard of plate stacks and channels in between for the gaseous media or inequilateral octagonal plate stacks and differently-sized square channel cross sections in between for the oxygen carrier and the fuel.

* * * * *